United States Patent [19]

Nakata

[11] 4,029,892

[45] June 14, 1977

[54] METHOD AND MEANS FOR TRAPPING PARTICLES IN ENCLOSED HIGH VOLTAGE ELECTRIC BUS APPARATUS

[75] Inventor: Roy Nakata, Pittsfield, Mass.

[73] Assignee: General Electric Company, Philadelphia, Pa.

[22] Filed: Nov. 28, 1975

[21] Appl. No.: 636,254

[52] U.S. Cl. .................. 174/14 R; 174/16 B; 174/21 C; 174/28

[51] Int. Cl.² ........................................ H01B 9/04

[58] Field of Search ............. 174/14 R, 16 B, 21 R, 174/21 JC, 21 C, 28, 99 B

[56] References Cited

UNITED STATES PATENTS

| | | | |
|---|---|---|---|
| 3,515,939 | 6/1970 | Trump | 174/28 X |
| 3,639,671 | 2/1972 | Clark | 174/28 X |
| 3,688,015 | 8/1972 | Graybill | 174/28 X |
| 3,767,837 | 10/1973 | Graybill | 174/28 X |
| 3,777,045 | 12/1973 | Artbauer | 174/28 |
| 3,789,214 | 1/1974 | Goldie et al. | 174/28 X |
| 3,792,188 | 2/1974 | Cronin | 174/28 |
| 3,813,475 | 5/1974 | Cronin | 174/28 X |
| 3,814,879 | 6/1974 | Cookson et al. | 174/28 UX |
| 3,856,978 | 12/1974 | Sletten et al. | 174/28 X |
| 3,864,507 | 2/1975 | Fox et al. | 174/28 X |
| 3,895,176 | 7/1975 | Cookson et al. | 174/16 B |
| 3,898,367 | 8/1975 | Nakata | 174/28 X |

OTHER PUBLICATIONS

Bortnik, I. M.; Cooke, C. M., Electrical Breakdown and the Similarity in SF₆ at Extra High Voltages, IEEE Winter Meeting, Power Engineering Society, Jan./Feb. 1972.

Diessner, A.; Trump, J. C., Free Conducting Particles in a Coaxial Compresed-Gas-Insulated System, IEEE Transactions on Pas, vol. 8, Nov./Dec. 1970, pp. 1970-1978.

Cronin, J. C., Perry, E., Optimization of Insulators for Gas Insulated Systems, IEEE Trans., Pas, vol. Pas-2, No. 2, Mars./Apr. 1973, pp. 558-564.

*Primary Examiner*—Arthur T. Grimley
*Attorney, Agent, or Firm*—William Freedman

[57] ABSTRACT

Enclosed gas-insulated electric bus apparatus especially designed for use in horizontal disposition with high unidirectional system voltage includes deep trench-like electrostatic particle traps and inclined ramps leading to the traps. A method for entrapping such particles prior to the application of system voltage comprises preliminary imposition of an alternating conditioning voltage of relatively low magnitude from a low power source, preferably in steps of increasing magnitude.

20 Claims, 10 Drawing Figures

METHOD AND MEANS FOR TRAPPING PARTICLES IN ENCLOSED HIGH VOLTAGE ELECTRIC BUS APPARATUS

My invention relates to high voltage electric bus apparatus comprising a bus conductor enclosed in radial spaced relation in a tubular, gas-filled grounded metal sheath, and particularly to enclosed bus apparatus designed for conduction of direct current at very high voltages, as over 50,000 volts. The invention concerns a method and means whereby loose solid particles, such as minute metallic filings and shavings, which unavoidably remain within the sheath after manufacture and assembly, may be trapped and retained during operation in locations remote from the annular insulating gas space between the high voltage central conductor and the grounded tubular outer sheath.

Electric bus apparatus of the character described, when filled with insulating gas such as sulphurhexafluoride at high pressure, has extremely high dielectric strength and is suitable for both alternating and direct current use at voltages well over 50,000 volt, as for example the range of 200,000 to 800,000 volts. At such voltages small loose solid particles, and particularly free conducting particles such as metal chips and shavings, which remain in the sheath even after careful mechanical cleaning prior to assembly, impair dielectric strength in a variety of ways. At such high voltage levels, and particularly in direct current applications, such particles may migrate between the grounded sheath and the enclosed high voltage conductor or remain in a levitated or partially levitated state adjacent the conductor surfaces. Under such conditions free conducting particles randomly in motion in the insulating gas space between electrodes may cause corona, sparks, "fireflies" and field distortion which severely reduce the dielectric strength in the insulating gas space. In addition, such particles tend to adhere by electrostatic action to the surfaces of supporting insulators within the sheath and thereby to facilitate creepage and breakdown along the insulator surfaces. Theories underlying these actions are explained at greater length in a paper by Cronin et al., entitled "Optimization of Insulators for Gas Insulated Systems", IEEE Transactions, Power Apparatus and Systems, Vol. PAS 92, No. 2, March/April 1973 pages 558–564, in a paper by Trump and Diessner entitled "Free Conducting Particles in a Coaxial Compressed Gas Insulated System", IEEE Transactions, Power Apparatus and Systems, Vol. PAS 89, No. 8, November/December 1970 pages 1970–1978, and in U.S. Pat. No. 3,814,879-Cookson et al.

It will be apparent from the foregoing patent and technical articles that various structures have been proposed for trapping free conducting particles in gas-filled enclosed electric bus apparatus. In addition U.S. Pat. No. 3,792,188-Cronin proposes that initial clean up be accomplished by the application of a high unidirectional voltage substantially lower than a high rated alternating voltage.

I have discovered that when a unidirectional voltage supplied between the electrodes of an enclosed gas-insulated electric bus apparatus is sufficiently high to levitate or lift off from the electrode surfaces any free conducting particles in the enclosure the particles will migrate back and forth between the electrodes, reversing their charge on each contact with an electrode. It can be demonstrated that with unidirectional voltage the lift-off, or levitation, voltage is substantially the same as transit voltage. It is very difficult to trap particles continuously migrating in this manner between electrodes. It is also known that when alternating current is applied between such electrodes free conducting particles in the interelectrode space will be partially or barely levitated at a first high voltage level, but will not perform a full transit to the other electrodes until a substantially higher voltage is applied. In the barely or partially levitated state particles are typically lifted from the surface and return toward or into reengagement with the surface repeatedly and in random manner as they dance or oscillate in a narrow region immediately adjacent the electrode surface. In carrying out my invention I utilize these characteristics to design an enclosed bus structure adapted to be readily and efficiently cleared of free conducting particles by application between conductors of an alternating conditioning voltage.

It is a general object of my invention to provide an improved method and means for trapping free conducting particles in gas-insulated tubular electric bus apparatus.

It is a more particular object of my invention to provide improved insulator mounting means cooperable with appropriately located particle traps to prevent the deposition of free conducting particles on the surface of supporting insulators in enclosed electric bus apparatus.

It is still another object of my invention to provide a sectional tubular enclosure for enclosed electric bus apparatus having a configuration cooperable with appropriately located particle traps to enable efficient trapping of free conducting particles within the enclosure.

Another object of my invention is to provide connecting means for joining the sections of a sectional tubular bus enclosure in a manner to form an efficient particle trap at the point of connection.

In carrying out my invention in one preferred embodiment I provide gas filled electric bus apparatus designed for axially horizontal disposition and comprising a sectionalized tubular outer metallic sheath, annular supporting insulators mounted at axially spaced apart points within the sheath and a concentric high voltage central conductor carried by the insulators. To support each insulator in the sheath I utilize a mounting ring fixed between a pair of oppositely flared conical metal collars which form part of or are fixed within the sheath. The conical collars of each pair are in axial juxtaposition with their ends of minimum cross section contiguous and their flared ends of maximum cross section remote. Immediately adjacent the vertically lowest point of each flared collar I provide a deep particle trapping trench or recess, the adjacent collar providing a bottom surface ramped downwardly toward the trap. Preferably the conical collars of each cooperating pair of collars are fixed connected at their remote ends, as by welding, to adjacent central portions of a tubular sheath section. Each sheath section then includes a conical end collar at each end, and axially adjacent sheath sections are connected together by bolting or otherwise connecting together cooperating pairs of conical collars with insulator mounting rings therebetween.

In another aspect of my invention the bottom of each sheath section between its conical end collars is inclined, as by slightly conical or double conical configuration of each sheath section between end collars, or by alternate axial inclination of the entire length of each bus section, with particle traps provided at the lowest points along the bottom of each sheath portion so inclined. For double conical sheath sections such particle traps may, for example, be disposed at each maximum diameter point along the sheath as well as adjacent each conical end collar as previously described.

In order to clear such a ramped or inclined bus structure of free conducting particles prior to energization at full rated voltage I apply between the sheath and the central conductor a high alternating voltage less than rated voltage and preferably of the order of 50 to 250 kV. Preferably such conditioning voltage is applied in steps of increasing magnitude, the voltage at each step being applied for a time sufficient to entrap all particles which would move across the insulating gap at the next higher voltage step.

My invention will be more fully understood and its various objects and advantages further appreciated by referring now to the following detailed specification taken in conjunction with the accompanying drawing wherein:

Figures 1, 2:
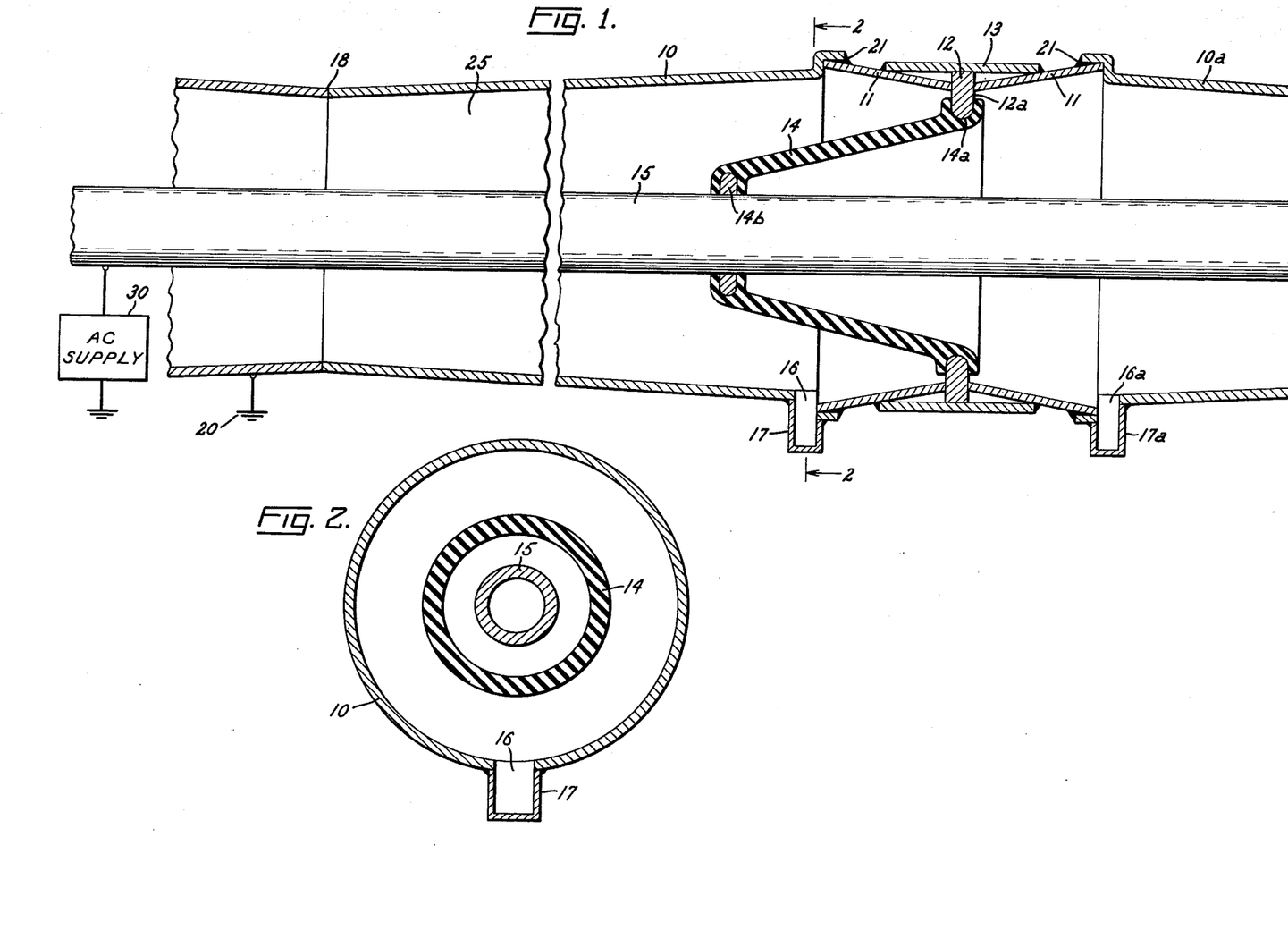
FIG. 1 is a fragmentary axial cross sectional view of a compressed gas insulated high voltage enclosed bus structure embodying my invention in one form.
FIG. 2 is a transverse cross sectional view taken along the line 2—2 of FIG. 1.

Referring now to the drawing, and particularly to FIG. 1, the illustrated bus apparatus comprises a sectional tubular metal sheath formed of a plurality of sections 10, 10a connected together in axial end-to-end relation with an insulator mounting ring 12 therebetween. Each section 10, 10a includes a central portion having outwardly converging conical collars 11 welded to each end, as at 21, the drawing illustrating only the connected ends of two adjacent bus sections.

Each cooperating pair of adjacent end collars 11 is connected together in opposed outwardly flared relation and the intermediate mounting ring 12 is supported by an annular connecting band 13 which is peripherially welded to each collar 11. Annular insulators 14 mounted within each mounting ring 12 carry a central high voltage conductor 15. It will of course be understood that only a short fragmentary portion of the bus structure is shown for the purpose of illustration and that the bus may comprise any desired number of tubular sheath sections 10, 10a etc. with insulator support rings 12 and insulators 14 mounted at spaced pointed along the sheath intermediate each adjacent pair of sheath sections. In the illustrated embodiment the tubular sheath is cylindrical in cross section but other tubular configurations may be used if desired.

The annular insulator 14 is illustrated as of conventional conical type having a central aperture through which the conductor 15 extends and an annular outer peripherial portion seated upon the mounting ring 12. If desired the insulator 14 may be provided with aperture to provide communication and pressure equalization between the axially adjacent gas spaces on opposite sides of the insulator. The outer periphery of the insulator 14 is provided with an annular groove 14a within which the mounting ring 12 is seated. The ring 12 is formed of metal or other conductive material, such as graphite-filled epoxy or the like, so that it serves also as a field flux grading ring. Preferably the grading and mounting ring 12 is formed of graphite-filled conducting rubber or other slightly resilient conductive material. A similar conductive grading ring 14b is seated within a groove at the inner periphery of the insulator 14 and is in supporting engagement with the central conductor 15. For a purpose to be described hereinafter a portion 12a of the conductive mounting ring 12 is exposed between the insulator 14 and the metal collars 11.

The end collars 11 are shown as only slightly conical (i.e., at a small angle with respect to central axis) and adjacent collars are in axial juxtaposition with their ends of minimum cross section (i.e., minimum diameter in a cylindrical sheath) adjacent the mounting and grading ring 12 and their ends of maximum cross section axially remote. The conical angle of the collars 11 need by only of the order of 5° but may of course be considerably larger if desired. The inner surfaces of juxtaposed collars 11 thus flare outwardly in opposite directions from the mounting and grading ring 12 so that with the axis of the bus horizontal the bottom surfaces of the collars 11 are inclined, or ramped, downwardly in opposite directions along the axis of the bus and away from the mounting ring 12. Along this bottom portion of the outer sheath, and immediately adjacent the lowest points of the opposed collars 11, the sheath sections 10, 10a are apertured at 16, 16a and small box-like receptacles 17, 17a are welded over the apertures to form particle traps. As shown at FIG. 2 the particle traps 17, 17a extend over a small arcuate bottom portion of the duct sections, subtending for example an arc of the order of 20° to 60°. Desirably the receptacles 17 are long in arcuate span and deep in a radial depth relative to their axial width, thereby to form trench-like traps having a length and depth of the order of at least several times their axial width. The axial width of each trap 17 should be small also in terms of the radial insulating gap between sheath 10, 10a and the central conductor 15, preferably being of the order of 1/10 or less the length of the insulating gap. By this deep trench configuration electrical flux lines of equipotential above sheath potential make only relatively shallow excursions into the open mouth of each trap.

It is desirable also to incline downwardly in an axial direction toward the particle traps 17, 17a the lower surface of each sheath section 10, 10a in its central region between the conical end collars. At FIG. 1 I have illustrated such inclination as resulting from the formation of the central portions of sheath sections 10, 10a, in opposed double conical form, with a waist, or minimum diameter section 18 intermediate the ends of each sheath section. Such opposed double conical sheath sections may be formed by a suitable rolling operation and the angle between the central axis and the elements of each conical portion need be only very slight, such as 2° to 5° or the like.

In operation, the conductive metallic sheath 10, 10a is usually grounded, as at 20, and the central conductor 15 is connected to a high voltage source of electric current supply. While the bus illustrated is adapted for the conduction of both alternating current and direct current, adequate dielectric strength between the inner-conductor and the sheath is most difficult to attain with very high unidirectional voltages, i.e., unidirectional voltages of the order of 50 to 800 kV between the central conductor and the sheath. In order to maintain a high dielectric strength between the conductor and sheath the annular insulating space therebetween is filled with a high dielectric strength pressurized gas 25 such as sulphurhexafluoride.

It has been recognized heretofore that freely movable solid particles in enclosed electric bus apparatus, and particularly free conducting particles such as metal filings, scrapings and slivers, will seriously impair dielectric strength in the annular gas space and along the insulator surfaces. It has been found that despite the most careful manufacturing and assembly methods, and despite the use of careful mechanical cleaning procedures, at least some such free particles will nearly always be present within the enclosing sheath 10, 10a. The action of such particles in initiating electrical breakdown radially through the gas space and along the surfaces of the insulators 12 is described in some detail in the IEEE articles referred to above and in the foregoing Cookson et al. patent.

I have discovered that when high voltages of the order of about 40,000 volts or more are applied between the central conductor and the grounded sheath of enclosed bus structure, free conducting particles within the sheath respond differently to unidirectional voltage than to alternating voltage. In each case a certain minimum voltage magnitude is required to create an electrostatic field sufficiently strong to levitate particles at the surface of either conductor, or electrode. When this lift-off or levitation voltage is attained with unidirectional voltage most levitated particles will traverse the annular gap between electrodes (i.e., between sheath and central conductor) without further increase in voltage. In an alternating current field, on the other hand, there exists a first threshold voltage at which small loose particles of a particular size, weight and configuration, and particularly conducting particles, are barely levitated from an electrode surface, but such voltage is insufficient to produce full transit of those particles between the electrodes before voltage reversal. At this bare levitation voltage most particles raised from an electrode surface move in erratic and irregular patterns toward and away from the surface due to changes in spacial disposition of the particles and concomitant change in field distortion in the region of each particle. At this bare levitation alternating voltage free conducting particles tend to dance about in random motion toward and away from a conductor surface during each half cycle and in a region close to the surface. On the reverse half cycle all levitated particles do not necessarily return to the electrode surface, but those which do are recharged to opposite potential, again rise up, and demonstrate a random dancing motion at a low levitation height.

I have discovered also that not all loose particles are levitated at the same alternating voltage magnitude. At a relatively low levitating voltage the smaller and lighter particles are first levitated, and as voltage is increased larger and heavier particles are levitated, the action depending not solely on size and weight but also on shape and conductivity. It appears also that for any particular group of levitated particles a higher voltage is required to initiate levitation than to maintain it. In general I have found that with gas-filled electric bus apparatus of the type described such bare levitation and dancing motion of most particles is initiated at voltage levels of the order of 90 kV or less and continues until voltage is reduced to something of the order of 40 kV.

As previously pointed out, when a unidirectional voltage between electrodes is raised to levitation level, erratic dancing motion of particles is minimized because the same voltage is sufficient to effect full transit between electrodes. While some limited dancing action may take place due to change in spacial disposition of a levitated particle, the predominant tendency is for particles to perform a full transit between electrodes. Such action is particularly undesirable in the region of the supporting insulators because particles which engage an insulator surface will adhere electrostatically to the surface and will remain so adhered. The insulator surfaces, therefore, eventually becoming coated with particles, thereby to encourage creep tracking and dielectric breakdown.

I have discovered that when free conducting particles in a high voltage enclosed bus apparatus of the character described are barely levitated under alternating voltage conditions as described above, and above a surface which is even slightly inclined to the horizontal, their dancing motion will cause progressive movement of the particles down hill along an inclined or ramped surface. It is to take advantage of this downward progression phenomenum that I have provided the inclined, or ramped, surfaces characteristic of the bottom portions of my improved bus structure, as shown at FIG. 1. It will be understood that under such alternating voltage conditions free particles will skip or dance down hill along the bottom surfaces of the end collars 11 and along the bottom surfaces of the central portions of sheath sections 10, 10a toward the electrostatic particle traps 17, 17a. As is well understood by those skilled in the art, particles which fall into these traps experience very little tendency to escape from the traps because of the low electrostatic field, or shielding effect, caused by the deep trench configuration. In this respect a relatively deep trap is more effective than a shallow trap.

The foregoing levitation and downhill progression is desirably carried out at a low levitation height in relation to the radial length of the insulating gap, for example a height of the order of ¼ inch or less in enclosed bus providing a radial gap length of 6 inches. It may not be noted that the exposed region 12a of the conductive mounting ring 12 is desirably somewhat greater in radial length than the height of the levitation region. By this means levitated particles are precluded from impinging on the adjacent surface of insulator 14 to which they would continue to adhere. The conductive character of the mounting and grading ring 12 precludes adherence to that surface. In this way the insulator 14 is maintained free from any particle coating due to conditioning by levitation and progression.

At FIG. 1 I have illustrated a source of alternating conditioning voltage 30 connected between ground (i.e., the potential of the sheath 10, 10a) and the central conductor 15. By applying such an alternating conditioning voltage having an ultimate root mean square (RMS) magnitude of the order of 50,000 to 250,000 volts for a period of several minutes loose particles remaining within the enclosing sheath 10, 10a after assembly are barely levitated and induced to skip down hill into the traps 17, 17a, where they will be retained even at unidirectional operating voltages of the order of 500,000 volts or more.

I find it especially advantageous to apply the alternating conditioning voltage in steps of increasing magnitude, retaining the voltage at each step before increasing to the next highest step for sufficiently long that substantially all particles levitated at each voltage step proceed to the traps before the next step of voltage is applied. In this way the lighter particles levitated at lower voltage steps are precluded from full transit across the insulating gap, as may occur with such particles at a higher voltage. As an example of stepped voltage application I find that it is satisfactory to increase voltage in steps increasing by about ten percent of the magnitude of the immediately preceding voltage, increasing the magnitude of these steps only after several steps of the same magnitude thereby to maintain an approximately ten percent relation described. In one particular application of my invention I have utilized an initial voltage of 25 kV (RMS), increasing in such steps to about 150 kV (RMS).

Figure 3:
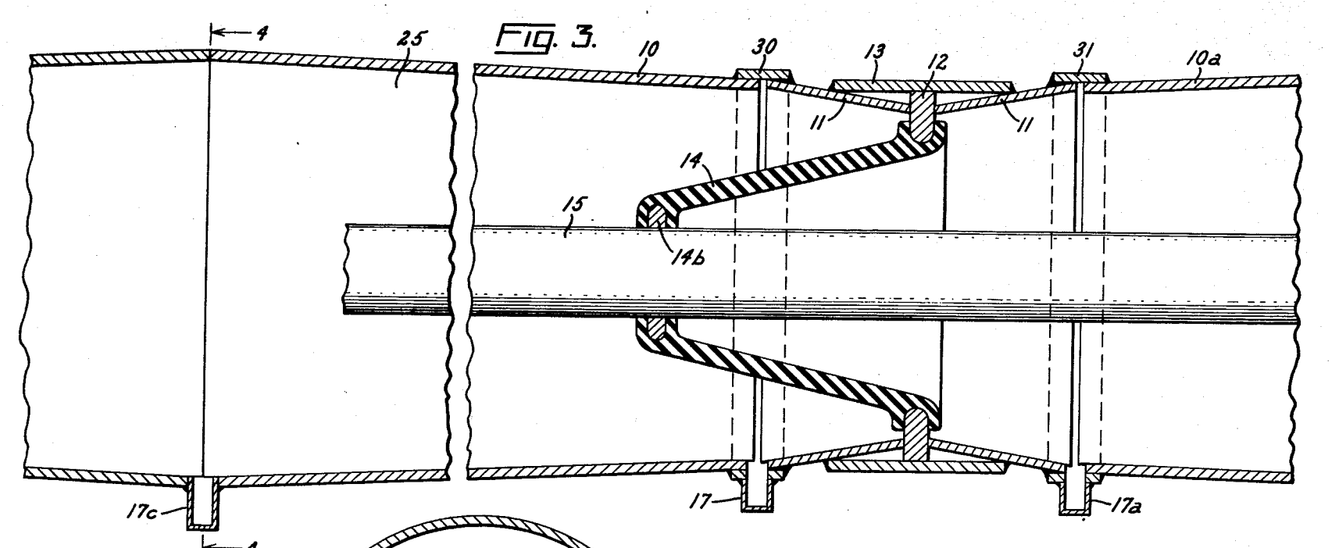
FIG. 3 is an axial cross sectional view of a compressed gas insulated high voltage bus structure embodying my invention in modified form.
Figure 4:
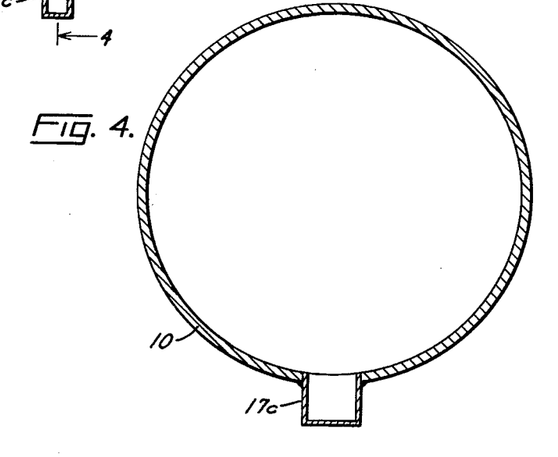
FIG. 4 is a transverse cross sectional view taken along the line 4—4 of FIG. 3.

At FIGS. 3 and 4 I have illustrated another embodiment of my invention in which the tubular sheath sections 10, 10a are each formed of opposed conical central portions having their maximum diameter at the center of each section or otherwise intermediate its ends, as at the Section 4—4 of FIG. 3. In such a sheath section the lowest point on the bottom of the central portion of the section is at the center of the section and a particle trap 17c is formed in the bottom of the sheath at that point, as illustrated at FIG. 4. At FIGS. 3 and 4 other parts corresponding to like parts at FIGS. 1 and 2 have been assigned the same reference numerals.

FIG. 3 serves also to illustrate that a doubly ramped insulator support comprising opposed conical collars 11 may be joined to the sheath sections 10, 10a, respectively, by means of split metal bands or garters 30, 31, each encircling the juncture of one collar and the main central portion of a sheath section. Such connecting bands are circumferentially welded to both the collar and central portion of the section. In this case the lower ends of the connecting bands 30, 31 are apertures, with particle traps 17, 17a mounted beneath the apertures. This embodiment of the invention has a certain advantage in minimizing the generation of loose metallic particles in the bus during assembly, in that the juxtaposed ends of the central portion of each sheath section and the conical collars 11 may be retaind in slightly spaced relation as the split connecting band 30 or 31 is drawn tightly around the joint prior to welding. In this way abrasion of the parts upon each other is minimized thereby to avoid the generation of metallic shavings.

Figure 5:
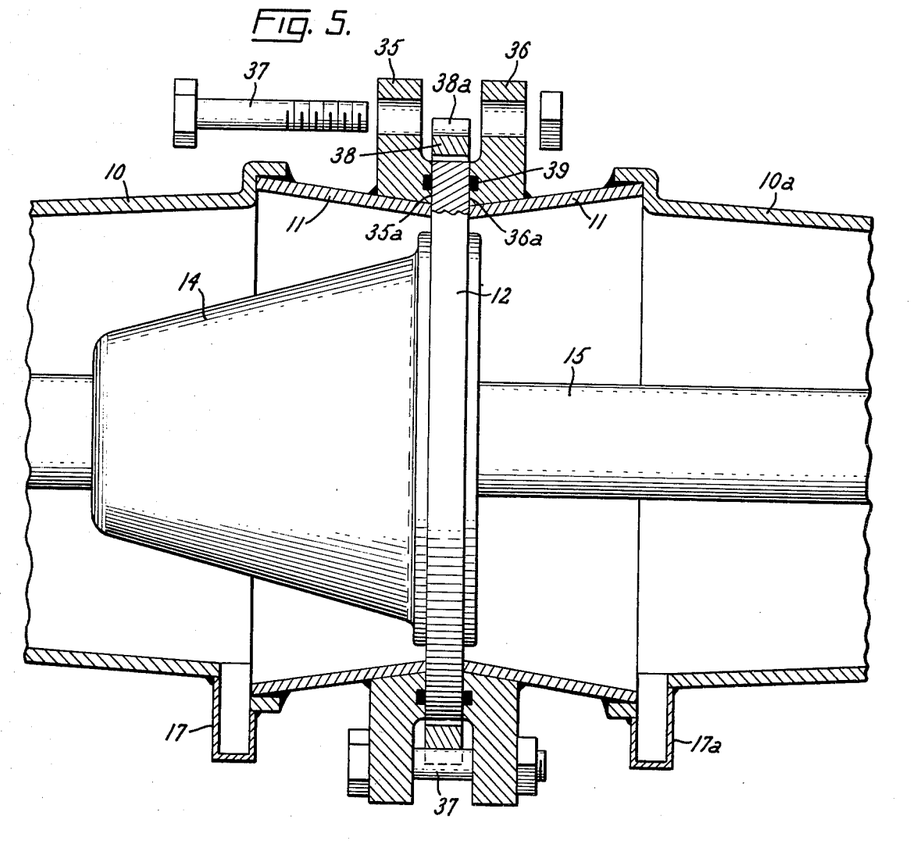
FIG. 5 is an axial cross sectional view of enclosed electric bus apparatus and a modified form of sheath coupling and insulator mounting embodying my invention.
Figure 5A:
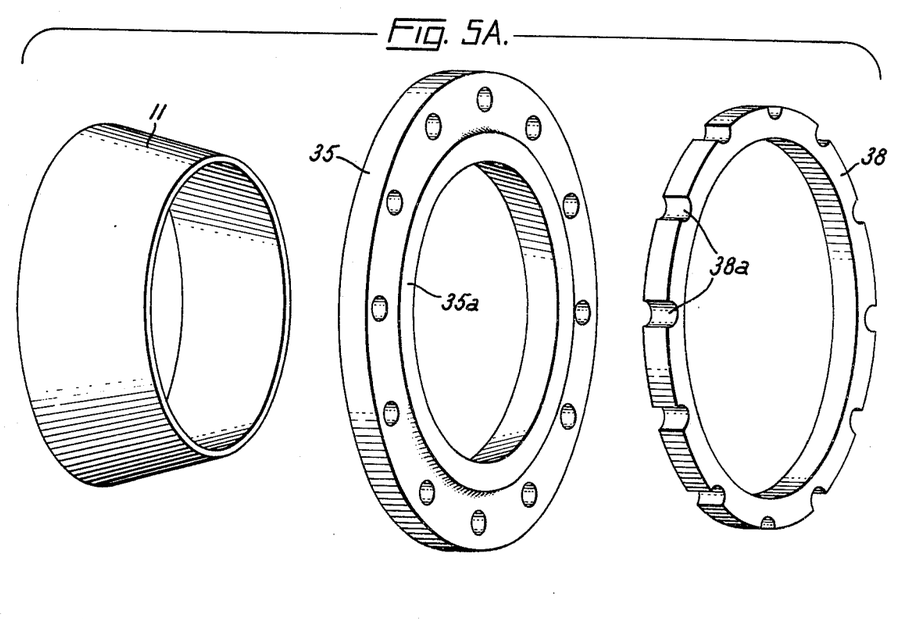
FIG. 5A is an exploded perspective view of some of the sheath coupling members shown at FIG. 5.

At FIGS. 5 and 5A I have illustrated a bolted form of sheath section coupling in which the opposed conical collars 11 of adjacent sections are bolted together and clamp the mounting and grading ring 12 therebetween. For this purpose the juxtaposed ends of the collars 11 are provided with external annular metal hubs 35, 36, respectively, welded to the couplings and disposed in axially spaced relation on opposite sides of the mounting ring 12. Each hub 35, 36 is provided with a plurality of bolt holes about its periphery to receive connecting bolts 37. For good sealing contact with the resilient mounting ring 12 each hub 35, 36 is provided with a raised annular surface or land 35a, 36a disposed to engage the ring 12 on opposite sides with annular gaskets 39 therebetween. To limit the clamping movement of the hubs 35, 36 toward each other it is desirable to provide an annular stop ring 38 positioned between the hubs outside the mounting ring 12. The stop ring 38 is provided with a plurality of peripheral positioning notches 38a to receive the bolts 37. The parts 35 and 38 and one collar 11 are shown in exploded perspective view at FIG. 5A.

Figure 6:
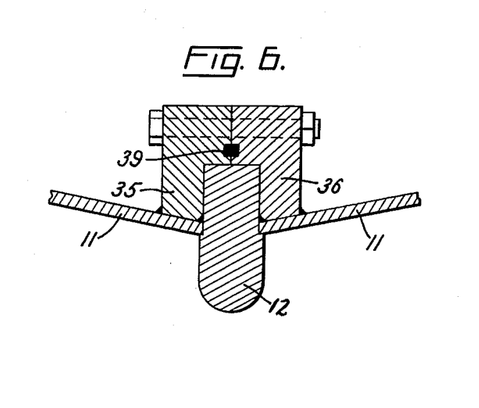
FIG. 6 is a fragmentary cross sectional view of another form of sheath coupling embodying my invention.

At FIG. 6 I have shown in fragmentary cross sectional view a pair of opposed conical end collars 11 similar to those of FIG. 5 but in which the bolting hubs 35, 36 are each dished and oppositely disposed so that they directly engage a single intermediate gasket 39 when drawn together, leaving between them an annular space within which the mounting and grading ring 12 is clamped.

Figure 7:
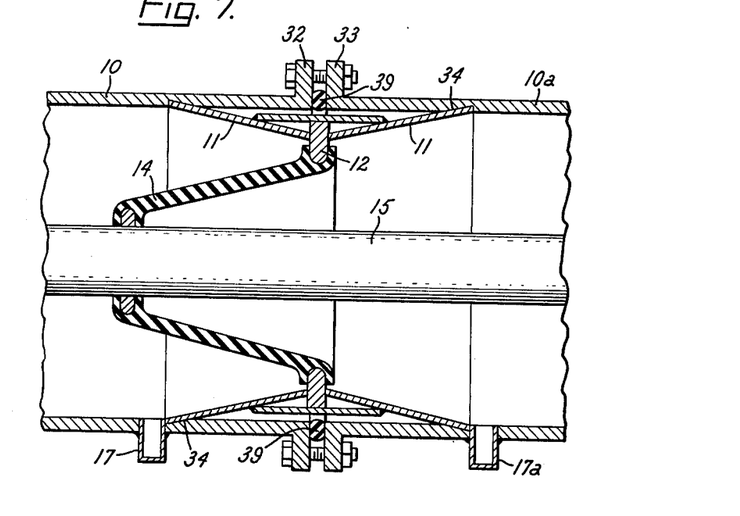
FIG. 7 is an axial cross sectional view of electric bus apparatus including an end collar and insulator mounting subassembly embodying my invention in still another form.

At FIG. 7 I have shown a modified form of sheath coupling in which the sheath sections 10, 10a have cylindrical ends provided with annular flanges 32, 33 and are bolted directly together with a single gasket 39 therebetween and an insulator mounting subassembly seated internally at the joint. The internal subassembly comprises a pair of outwardly flared opposed conical collars 11 with a mounting ring 12 fixed therebetween in the manner shown at FIGS. 1 and 3. The collars 11 are seated within internal annular notches 34 in the sheath sections at opposite sides of the bolted joint. In this construction the particle traps 17, 17a are formed directly in the sheath sections 10, 10a immediately adjacent the seating notches 34 and at the low points of the ramped collars 11.

Figure 8:
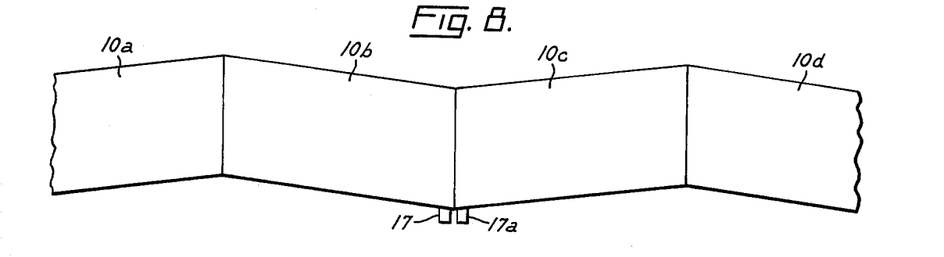
FIG. 8 is a side elevational view of sectionally inclined electric bus apparatus illustrating one aspect of my invention in still another form.

Referring now to FIG. 8 I have shown in schematic side elevational view an enclosing sheath for electric bus apparatus in which adjacent sheath sections 10a–10d etc. are oppositely inclined with respect to the horizontal by cutting each sheath section at its ends at a slight angle with respect to a plane perpendicular to the axis of the section, the ends of each section being cut in parallel planes. By assembling these sections with their sectional axes alternately oppositely inclined with respect to the horizontal, the bottom surfaces of all sections are inclined for the purpose described in connection with the conically formed sheath sections illustrated at FIGS. 1 and 3. To trap particles receptacles 17, 17a are formed at those sheath junctures connecting sheath sections downwardly inclined toward each other. A sectional central conductor (not shown) may be along the sectional sheath axes or may be in a straight line along the general axes of the entire sheath.

Figure 9:
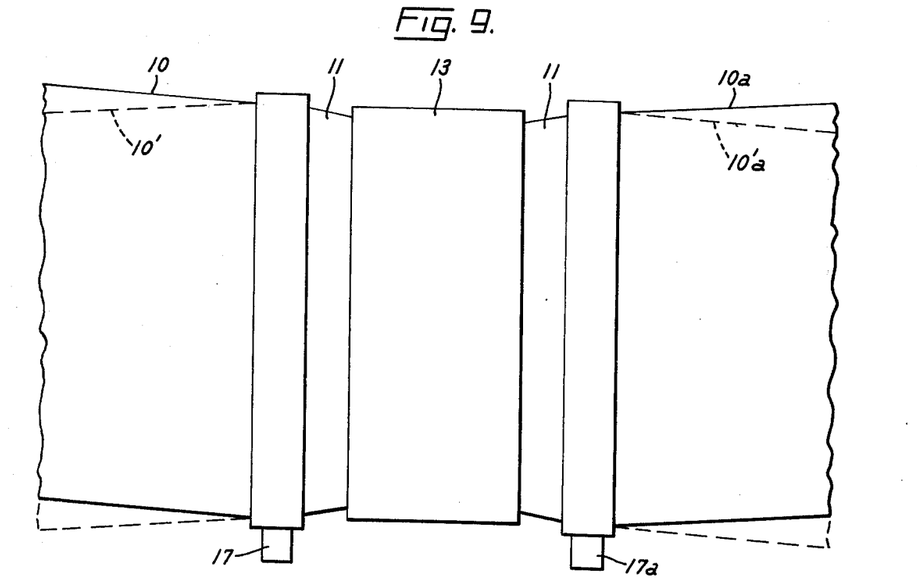
FIG. 9 is an axial cross sectional view of a conical collar coupling and insulator mounting interposed between adjacent sections of the bus apparatus shown at FIG. 8.

At FIG. 8 I have not illustrated any conical end collars on each sheath section, but it will be understood from the foregoing that at each sheath juncture where an insulator is desired a pair of flared or ramped conical collars and insulator mounting ring similar to those illustrated at FIGS. 1, 3, 5, 6 and 7 may be interposed, as illustrated at FIG. 9. At FIG. 9 adjacent sheath sections 10, 10a are shown in solid lines as inclined downwardly toward each other, while the dotted lines 10', 10'a illustrate that the juncture may be one in which the adjacent sheath sections are inclined downwardly away from each other.

While I have described and illustrated only certain preferred embodiments of my invention by way of example, many modifications will occur to those skilled in the art. For example, while I have shown a sheath of circular cross section by way of illustration, my invention is applicable to sheaths of square, rectangular or other geometric configuration, the flared annular insulator mounting collars having in each case a like cross sectional shape. I therefore wish to have it understood that I intend in the appended claims to cover all such modifications as fall within the true spirit and scope of my invention.

What I claim as new and desire to secure by Letters Patent of the United States is:

1. Compressed gas insulated high voltage electric bus apparatus adapted for disposition with its longitudinal axis horizontal which comprises, a sectional tubular sheath of electrically conductive material adapted to be maintained at essentially ground potential, said sheath comprising a plurality of tubular sections connected together in hermetically-sealed end-to-end relation and being filled with an insulating gas under pressure, an elongated conductor within said sheath adapted to be maintained at high voltage with respect to ground, a plurality of insulators radially interposed between said conductor and said sheath at axially spaced apart junctures of said sheath sections for maintaining said conductor in substantially coaxial radially-spaced relation within said sheath, insulator supporting means at each such juncture comprising a pair of electrically conductive axially flared collars fixed to said sheath and having insulator mounting means therebetween, each said pair of flared collars being disposed in axially opposed relation with their ends of minimum cross section contiguous and their flared ends remote thereby to provide bottom surfaces inclined downwardly in both axial directions away from said insulator mounting means, and particle trapping receptacles formed in the bottom surface of said sheath immediately adjacent the lowest point of each said downwardly inclined surface.

2. Bus apparatus according to claim 1 wherein adjacent sheath sections each include one flared collar and are coupled together with opposed collars forming a contiguous pair of collars having said insulator mounting means therebetween.

3. Bus apparatus according to claim 1 wherein each contiguous pair of glared collars is mounted upon the inner surface of said sheath.

4. Bus apparatus according to claim 1 wherein each said receptacle forms a deep trench having a depth and arcuate length of the order of at least several times its width in the axial direction of said bus.

5. Bus apparatus according to claim 4 wherein the width of each said receptacle is of the order of one tenth the radial distance between said sheath and said coaxial conductor.

6. Compressed gas insulated high voltage electric bus apparatus adapted for disposition with its general longitudinal axis horizontal which comprises, a sectional tubular sheath of electrically conductive material adapted to be maintained at essentially ground potential, said sheath comprising a plurality of tubular sections coupled together in hermetically sealed end-to-end relation and being filled with an insulating gas under pressure, each section of said sheath including a bottom surface portion inclined at a small angle with respect to said general horizontal axis, and particle trapping receptacles formed in the bottom surface of said sheath immediately adjacent the lowest point of each said inclined surface portion.

7. Bus apparatus according to claim 6 wherein each said sheath section comprises oppositely disposed conical portions having an intermediate region of maximum cross section.

8. Bus apparatus according to claim 7 wherein said conical portions are contiguous at their ends of maximum cross section.

9. Bus apparatus according to claim 6 wherein each said sheath section comprises oppositely disposed conical portions having contiguous ends of minimum cross section.

10. Bus apparatus according to claim 6 wherein each said sheath section is rectilinear with terminal ends lying in parallel planes inclined with respect to the longitudinal axis of the intermediate sheath section, said sections being assembled with their sectional axes oppositely inclined to said general horizontal axis.

11. Bus apparatus according to claim 1 wherein a contiguous pair of said flared collars is disposed at each sectional juncture of said sheath and each sheath section intermediate adjacent pairs of said collars comprises oppositely disposed conical portions having a central region of maximum cross section, particle trapping receptacles being disposed at the bottom surface of each said maximum cross section regions.

12. Bus apparatus according to claim 1 wherein each said sheath section includes a rectilinear central portion between adjacent pairs of said flared collars, said central portions having ends disposed in parallel planes inclined with respect to the sectional axis, said sections being assembled with their sectional axes oppositely inclined to the horizontal axis of said bus.

13. Bus apparatus according to claim 1 wherein each said insulator mounting means comprises a ring of electrically conductive material interposed between contiguous flared collars and having an exposed annular portion radially intermediate said collars and the insulator supported thereby.

14. Bus apparatus according to claim 1 wherein said insulator mounting means comprises a ring of electrically conductive material interposed between contiguous flared collars and said contiguous collars are welded to an intermediate annular band encircling said ring and said collars.

15. Bus apparatus according to claim 1 wherein said insulator mounting means comprises a ring of electrically conductive material interposed between contiguous flared collars and contiguous ends of said collars comprise annular flanges bolted together with said mounting ring clamped therebetween.

16. A method for immobilizing free conducting particles in a high voltage electric bus structure adapted for disposition with its longitudinal axis horizontal, said bus structure including a central high voltage conductor mounted upon axially spaced annular insulators within a tubular enclosing sheath and being designed for system voltage between said conductor and sheath sufficiently high to transport said particles therebetween, said sheath having at least a portion of its bottom wall inclined in an axial direction at an angle of the order of 20° or less with respect to said axis and having a particle trapping receptacle adjacent the lowest point of said wall portion; said method comprising the steps of assembling said bus structure in an axially horizontal position with said bottom wall vertically below said axis, applying between said conductor and sheath an alternating conditioning voltage having a magnitude less than said system voltage and sufficient to levitate said particles in a surface region adjacent said bottom wall, said particles thereafter assuming a transverse oscillatory motion within said surface region under the influence of said conditioning voltage while moving progressively along said inclined wall portion toward and into said trapping receptacle, and removing said conditioning voltage before applying said system voltage.

17. The method of claim 16 wherein said system voltage is unidirectional or alternating voltage of 50,000 volts or more and said alternating conditioning voltage is applied in steps of increasing magnitude up to at least of the order of 90,000 volts RMS.

18. The method of claim 17 wherein the conditioning voltage initially applied is of the order of 25,000 volts RMS and said steps of voltage increase the immediately preceding magnitude by approximately ten percent at each step or group of steps.

19. The method of claim 18 applied to electric bus structure wherein each said insulator is mounted between a pair of said inclined bottom wall portions having their high ends contiguous and insulator mounting means therebetween.

20. The method of claim 19 wherein said insulator mounting means is electrically conductive and exposed between said insulator and sheath for a radial distance greater than the radial height of particle levitation in said surface region.

* * * * *